Patented June 23, 1925.

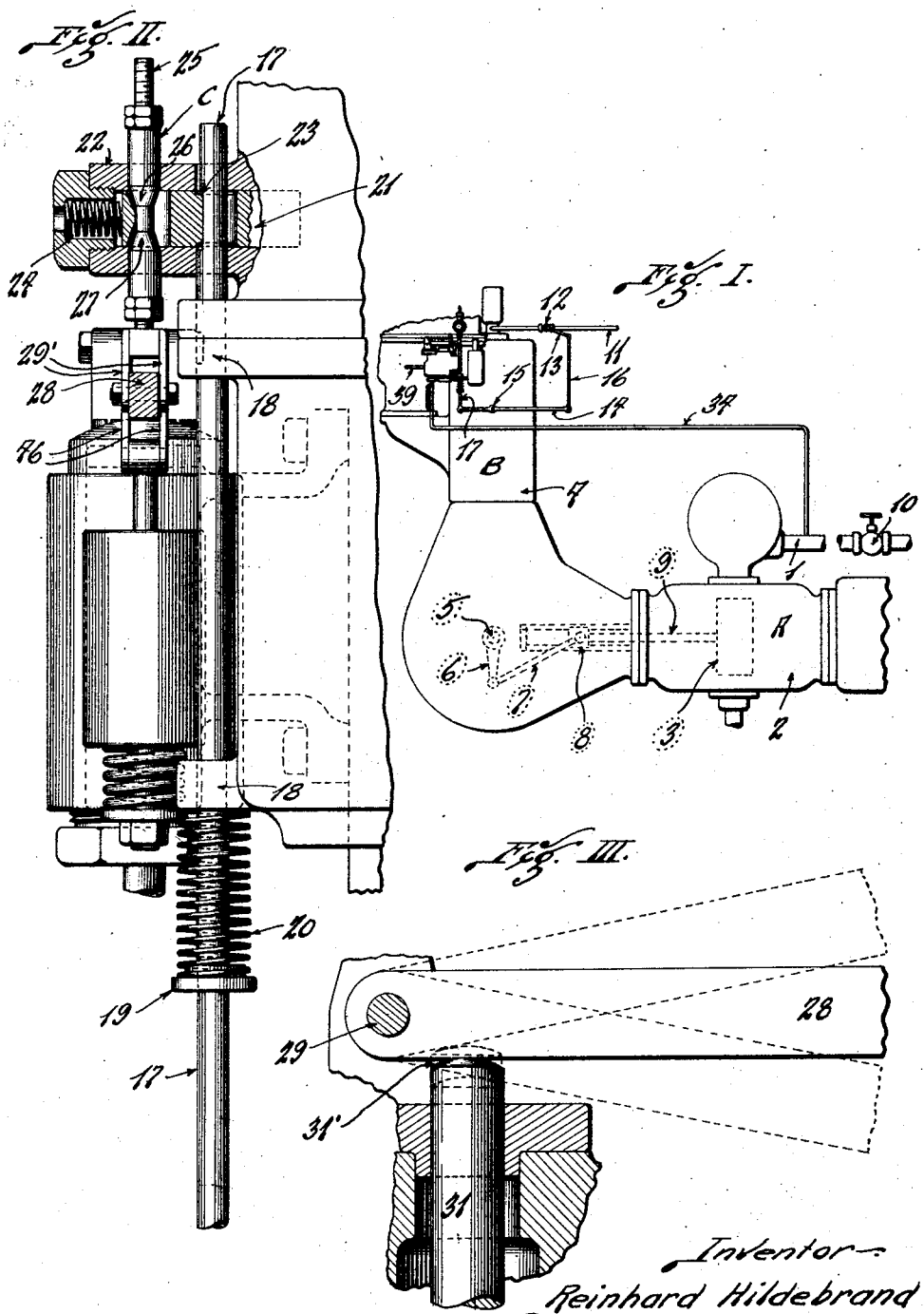

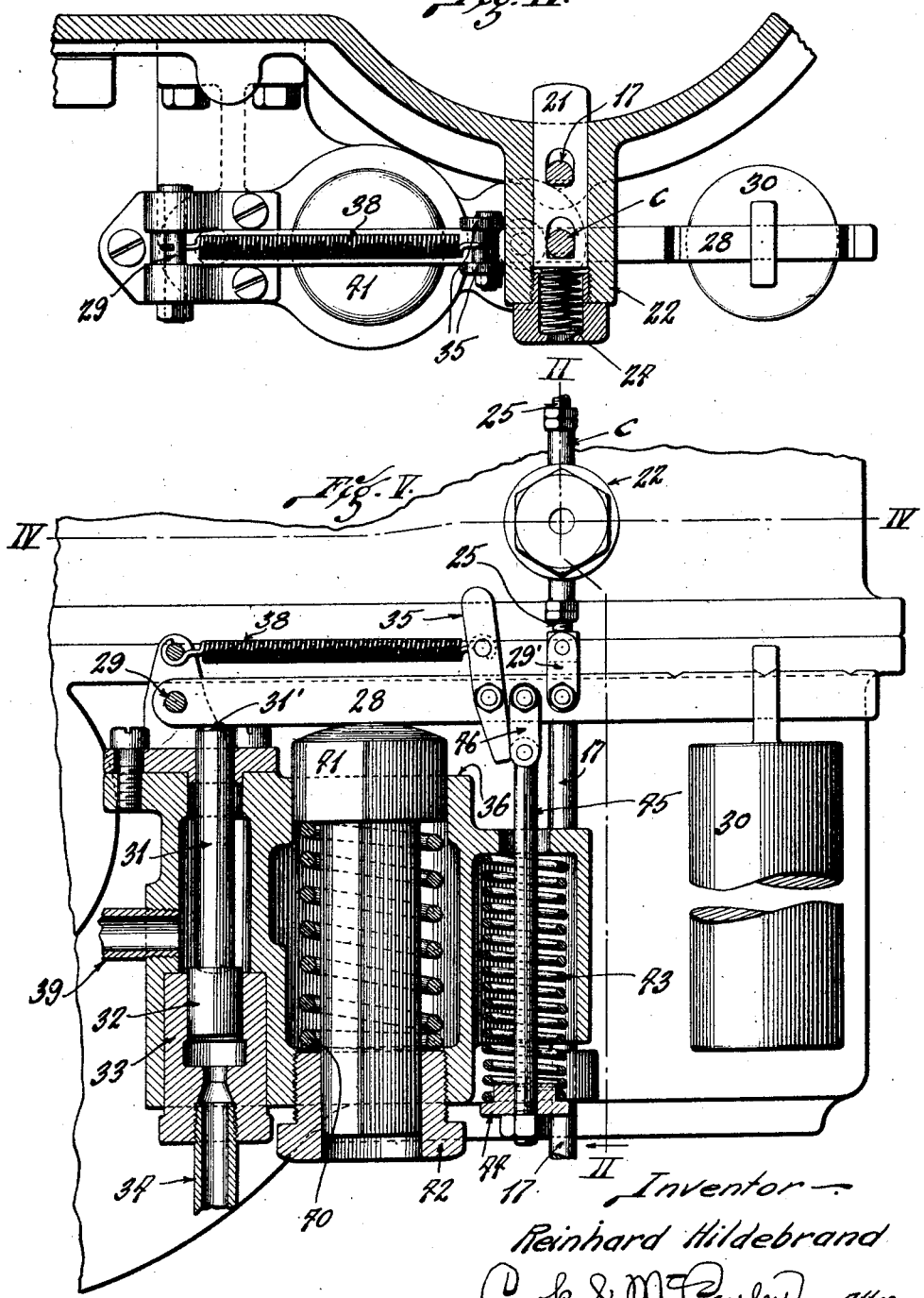

1,542,878

UNITED STATES PATENT OFFICE.

REINHARD HILDEBRAND, OF WEBSTER GROVES, MISSOURI, ASSIGNOR TO FULTON IRON WORKS COMPANY, OF ST. LOUIS, MISSOURI, A CORPORATION OF DELAWARE.

AUTOMATIC STOPPING DEVICE.

Application filed March 14, 1921. Serial No. 452,303.

*To all whom it may concern:*

Be it known that I, REINHARD HILDEBRAND, a citizen of Germany, and a resident of Webster Groves, in the county of St. Louis and State of Missouri, have invented certain new and useful Improvements in Automatic Stopping Devices, of which the following is a full, clear, and exact description, reference being had to the accompanying drawings, forming a part of this specification.

This invention relates to improvements in automatic stopping devices adapted to stop a motor, or a pump, one of the objects being to provide an automatic device for stopping a pump in response to high and low pressures. In a pumping system, the pressure will become dangerously high when the discharge line leading from the pump is accidentally closed by a valve or some other obstruction, and a very great reduction in the pressure may result from leakage in the discharge line. The automatic stopping device herein disclosed is especially adapted for use with a very large pump for forcing oil through a large pipe line. If the discharge line is closed for any reason, the pressure at the pump will rise and the automatic device will then stop the pump. Or, if there is undue leakage in the discharge line, such as may be caused by breakage of the oil conducting pipe, there will be a very material reduction in the fluid pressure, and the automatic device will then stop the pump. It will thus be seen that the pump is automatically stopped in response to an undesirable high pressure, and that it is also stopped in response to a substantial reduction in the pressure, so as to minimize the expense and danger of forcing oil through a leak in the pipe line.

Another object is to provide an automatic stopping device including an operating member actuated by fluid pressure, and means for preventing undue vibration of the operating member, thereby stabilizing the operating means.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a diagrammatical view illustrating an engine and a pump equipped with an automatic stopping device embodying the features of this invention.

Fig. II is an enlarged vertical section taken approximately on the line II—II, Fig. V.

Fig. III is an enlarged detail view illustrating the fluid actuated thrust member through which motion is transmitted to an operating lever.

Fig. IV is a horizontal section taken approximately on the line IV—IV, Fig. V.

Fig. V is a side elevation, partly in section, showing the operating means for the automatic stopping device.

A designates a pump (Fig. I) provided with a discharge pipe 1 through which fluid under pressure is forced from the pump. The pump includes a cylinder 2 provided with a piston 3 adapted to be actuated by an engine B. The engine herein shown includes a cylinder 4, and a power shaft 5 provided with a crank 6. 7 designates a connecting rod whereby the crank 6 is secured to a crosshead 8, the latter being fixed to the piston rod 9. The piston 3 is reciprocated by the mechanism just described, so as to force fluid from the pump cylinder 2 and through the discharge pipe 1 leading from the pump. A normally open valve 10 is located in the discharge pipe 1.

The engine B may be considered as an internal combustion engine, and it is provided with an inlet pipe 11 (Fig. I) for the admission of fuel to the engine cylinder. A valve 12, located in the fuel pipe 11, may be closed to discontinue the delivery of fuel to the engine. This valve is to be considered as a suitable means for stopping the engine, thereby stopping the pump, and said valve is provided with an operating handle 13 which is operated automatically, as will be hereafter described.

The means for operating the valve 12 includes a lever 14 (Fig. I) fulcrumed at 15 and connected to the valve handle 13 through the medium of a link 16. A vertical operating rod 17 is secured to one end of the lever 14, said rod 17 being slidably mounted in guides 18, shown in Fig. II. A collar 19 is fixed to the rod 17 (Fig. II) and a compression spring 20 is interposed between the collar 19 and one of the guides 18. This spring tends to move the operating rod 17 in a downward direction, thereby tending to close the valve 12. This valve is closed for the purpose of stopping the engine, and the rod 17 is normally held in its elevated position, so as to retain the valve in its open position.

The upper end of the operating rod 17 extends through a horizontally movable latch member 21 (Figs. II and IV) slidably mounted in the guide 22. The operating rod 17 is notched to provide a shoulder 23 which normally rests upon the latch member 21 to retain the rod 17 in its elevated position. 24 designates a spring whereby the latch member 21 is yieldingly held in the position shown by Figs. II and IV, so as to retain said latch member in engagement with the operating rod 17. The latch member 21 may be shifted to the left from the position shown by Fig. II, and in this event the operating rod 17 will be released and forced downwardly by the spring 20, thereby operating the lever 14 (Fig. I), link 16 and valve handle 13, to close the valve 12.

The means for releasing the locking member 21 includes a double action cam C adjustably mounted on a threaded rod 25 and provided with tapering cam faces 26 and 27 which are shown in Fig. II. This cam device extends through the locking member 21, and the latter is provided with inclined faces which lie adjacent to the cam faces 26 and 27. The cam C is slidably mounted in the guide 22, and it may be moved vertically for the purpose of transmitting movement to the locking member 21. When the cam C is moved downwardly from the position shown by Fig. II, its cam face 26 will engage one of the inclines on the locking member 21, so as to move the latter to the left, thereby releasing the vertical operating rod 17 to stop the engine. When the cam C is moved upwardly from the position shown by Fig. II, its cam face 27 will engage the locking member 21 to release the operating rod 17. It will now be understood that the cam C, including the cam faces 26 and 27, may be moved either upwardly or downwardly, and that the engine will be stopped in response to either of these movements.

The means for operating the cam C includes an operating lever 28 fulcrumed on a rod 29, and a weight 30 adjustably mounted on said lever. The cam holding rod 25 is connected to the operating lever 28 through the medium of links 29'. The weight 30 tends to move the operating lever in a downward direction, thereby tending to impart a corresponding movement to the cam C. Under certain conditions to be hereinafter pointed out, the weight 30 is permitted to actuate the lever 28 for the purpose of operating the cam C to stop the engine, and under other conditions the lever 28 is elevated with the result of lifting the cam C to stop the engine.

The means for lifting the operating lever 28 includes a vertically movable thrust rod 31 engaging the lower edge of lever 28 and seated upon the top of a plunger 32 (Fig. V) the latter being mounted in a cylinder 33. As shown by Figs. I and V, a fluid conducting pipe 34 leads from the discharge pipe 1 of the pump to the cylinder 33, for the purpose of transmitting pressure from the pump to the plunger 32 whereby the thrust rod 31 is actuated. In response to an abnormally high pressure in the discharge line 1 of the pump, the plunger 32 (Fig. V) will rise in the cylinder 33 thereby lifting the operating lever 28 and cam C so as to release the locking member 21 from the vertical operating rod 17. When the pressure in the discharge line 1 drops to a predetermined low degree, there will be a corresponding reduction of the fluid pressure in the small cylinder 33 (Fig. V) and a weight 30 will then move the operating lever 28 in a downward direction, with the result of imparting a corresponding movement to the cam C.

Briefly stated, the operation of the device is as follows:

When the valve 10 (Fig. I) in the discharge line of the pump is closed, or when the outgoing fluid is otherwise obstructed or retarded, the fluid pressure at the discharge side of the pump will rise very rapidly, and since this pressure is transmitted through the pipe 34 to the cylinder 33 (Fig. V) the piston 32 and thrust rod 31 will move upwardly to lift the weighted operating lever 28 and cam C, thereby causing the cam face 27 (Fig. II) to engage the locking member 21 which is thus moved to the left from the position shown by Fig. II. The locking member is thus released from the shoulder 23 in the vertical operating rod 17, permitting the spring 20 to impart a downward thrust to rod 17, which actuates the lever 14 (Fig. I), link 16 and valve handle 13 to close the valve 12, whereby the engine is stopped to stop the pump. The pump is also stopped in response to a substantial reduction of the pressure in the discharge line 1, and such reduction in pressure may result from accidental leakage of the oil, or other fluid, passing from the pump. Under normal operating conditions, the fluid pressure in the discharge pipe 1 and pipe 34 is great enough to retain the weighted lever 28 in an approximately horizontal position, shown by Fig. V. When this pressure drops to a predetermined low degree, the weighted lever 28 will move downwardly and impart a corresponding movement to the thrust rod 31 and piston 32, at the same time imparting a downward movement to the cam C, whereby the cam face 26 (Fig. II) is engaged with the locking member 21 to shift the latter to the left from the position shown by Fig. II. This will release the vertical operating rod 17 to stop the engine.

To start the engine after it has been stopped by the automatic device, it is necessary to open the valve 12 (Fig. I), and to accomplish this the vertical operating rod 17 should be shifted to its elevated position, shown by Fig. II, and it should be held there by means of the locking member 21. After the operating lever 28 has moved downwardly, it can be lifted by hand for the purpose of elevating the cam C and thereby permitting the locking member 21 to engage the vertical operating rod 17, and after the operating lever 28 has been lifted, it can be held by a manually operable retaining device comprising a stop lever 35 (Fig. V) pivoted to the lever 28 and adapted to frictionally engage a stationary abutment 36. In this event, a spring 38 (Fig. V) will tend to disengage the stop lever 35 from the abutment 36, and after the lever 28 has been lifted a slight distance through the medium of fluid pressure in the cylinder 33 (Fig. V), the spring 38 will shift the stop lever 35 to an ineffective position shown by Fig. V, where it will not interfere with the automatic operation of lever 28.

The fluid escaping past the small piston 32 (Fig. V) will be discharged through a pipe 39.

The operating lever 28 (Fig. V) moves in response to variations in the fluid pressure, and I desire to prevent undue vibration of this lever, so as to stabilize the automatic mechanism. In Fig. V, 40 designates a compression spring interposed between the head of a plunger 41 and a spring seat 42, the latter being adjustably mounted in the stationary part of the apparatus. The upper end of the plunger 41 is provided with a convex face which engages the lower edge of lever 28. 43 designates a compression spring engaging a spring seat 44 at the lower end of a rod 45, the latter being connected to the lever 28 through the medium of links 46. The spring 43 tends to move the lever 28 downwardly while the spring 40 tends to move the lever upwardly, so these oppositely acting springs tend to prevent vibration of the weighted lever 28. It is to be understood that the weight 30, considered alone can be lifted by a predetermined degree of power, and after it has been placed in motion by such power, the weight will move an indefinite distance unless there is some obstruction, or the like, tending to limit the motion. A helical spring, such as the spring 40 or the spring 43, will offer a gradually increasing resistance to any forces tending to compress the spring. Therefore, when the weighted lever is thrown upwardly, the spring 43 will offer a gradually increasing resistance to the lever, and thereby prevent undue upward motion of the lever. In a similar manner, the spring 40 offers a gradually increasing resistance to the downward motion of the weighted lever 28. By combining the springs 40 and 43 with the operating lever 28, as herein shown said springs tend to retain the lever 28 in an ineffective position, shown by Fig. V, thereby tending to prevent undue vibrations which would otherwise result from slight changes in the fluid pressure at the small piston 32. The thrust rod 31 (Figs. III and V) engages the operating lever 28 in a peculiar manner, and cooperates with the springs in preventing undue motion of said lever. The upper end of thrust rod 31 is provided with a convex abutment face 31' which engages the lower edge of the lever 28. This curved abutment face provides points of contact at different distances from the fulcrum 29 of the lever 28. When the thrust rod 31 occupies its lowest position as indicated by dotted lines in Fig. III, its curved face 31' engages the lever 28 at a point remote from the fulcrum 29, and when this rod 31 occupies its highest position, it engages the lever 28 at a point closer to the fulcrum thereof, as indicated by dotted lines in Fig. III. Therefore, the leverage constantly decreases as the thrust rod 31 rises, and this tends to prevent undue upward movement of the thrust rod and lever 28. A simple weighted lever may be moved an indefinite distance in response to a predetermined degree of power, but owing to the change in leverage indicated by Fig. III, a constantly increasing degree of power will be required to lift the weighted lever 28. So the thrust rod 31 having the convex face 31' cooperates with the springs 40 and 43 to prevent undue motion of the operating lever 28.

I claim:

1. In a pumping apparatus comprising a pump and a motor for actuating same, an automatic stopping device whereby said pump is stopped in response to predetermined high and low pressures, said automatic stopping device including operating means controlled by the fluid pressure transmitted from the pump, and said operating means including an operating member movable in one direction to stop the pump in response to a high pressure and movable in the opposite direction to stop the pump in response to a reduction in the pressure, yielding means tending to move said operating member in opposite directions, a weight tending to move said operating member in one of said directions, a pressure-responsive device adapted to move said operating member in the other of said directions, and means whereby fluid pressure is transmitted from said pump to said pressure-responsive device.

2. In a pumping apparatus comprising a pump and a motor for actuating same, an automatic stopping device whereby said pump is stopped in response to predetermined high and low pressures, said automatic stopping device including operating means controlled by the fluid pressure transmitted from the pump, said operating means including an operating lever movable in one direction to stop the pump in response to a high pressure and movable in the opposite direction to stop the pump in response to a reduction in the pressure, springs tending to move said operating lever in opposite directions, a weight tending to move said operating lever in one of said directions, a pressure-responsive thrust member adapted to move said operating lever in the other direction, and means whereby fluid pressure is transmitted from said pump to said thrust member.

3. A pumping apparatus comprising a pump and an automatic stopping device therefor, said automatic stopping device comprising an operating member movable to stop the pump, springs tending to move said operating member in opposite directions, a pressure-responsive device adapted to move said operating member in one of said directions, means adapted to move said operating member in the other of said directions, and means whereby fluid pressure is transmitted from said pump to said pressure-responsive device.

4. A pumping apparatus comprising a pump and an automatic stopping device therefor, said automatic stopping device comprising an operating lever movable to stop the pump, springs tending to move said operating lever in opposite directions, a pressure-responsive device adapted to move said operating lever in one of said directions, a weight tending to move said operating lever in the other of said directions, and means whereby fluid pressure is transmitted from said pump to said pressure-responsive device.

5. A pumping apparatus comprising a pump and an automatic stopping device therefor, said automatic stopping device comprising an operating lever movable to stop the pump, a pressure-responsive thrust member, means whereby said operating lever is yieldingly held in engagement with said thrust member, said thrust member having an abutment face providing points of contact adapted to engage said lever at different distances from the fulcrum thereof, and means whereby fluid pressure is transmitted from said pump to said thrust member.

6. A pumping apparatus comprising a pump and an automatic stopping device therefor, said automatic stopping device comprising an operating lever movable to stop the pump, a pressure-responsive thrust member, means whereby said operating lever is yieldingly held in engagement with said thrust member, said thrust member having a curved abutment face providing points of contact for said lever at different distances from the fulcrum thereof, and means whereby fluid pressure is transmitted from said pump to said thrust member.

7. A pumping apparatus comprising a pump and an automatic stopping device therefor, said automatic stopping device including an operating lever movable to stop the pump, springs tending to move said operating lever in opposite directions, a pressure-responsive device including a thrust member adapted to move said operating lever in one of said directions, said thrust member being movable in a line at an angle to the path of said lever so as to engage said lever at different distances from its fulcrum, and means whereby fluid pressure is transmitted from said pump to said pressure-responsive device.

8. A pumping apparatus comprising a pump and an automatic stopping device therefor, said automatic stopping device including an operating member movable to stop the pump, yielding means tending to actuate said operating member, a holder whereby said operating member is normally secured, and a pressure-responsive device whereby said holder is shifted to release said operating member, said pressure responsive device comprising a pair of actuating elements movable in opposite directions in response to high and low pressure so as to engage and actuate said holder.

9. A pumping apparatus comprising a pump and an automatic stopping device therefor, said automatic stopping device including an operating member movable to stop the pump, yielding means tending to move said operating member, a holder including a latch member whereby said operating member is normally secured, and a pressure-responsive device comprising oppositely disposed cams whereby said latch member is shifted to release said operating member.

10. In a pumping apparatus comprising a pump and a motor for actuating same, an automatic stopping device whereby said pump is stopped in response to predetermined high and low pressure said automatic stopping device including operating means controlled by the fluid pressure transmitted from the pump, said operating means including a trippable operating member movable in one direction to stop the pump, yielding means tending to actuate said trippable operating member, a latch member whereby said operating member is normally secured, a spring tending to retain said latch member in its operative position, a double-action cam movable in opposite directions and adapted to release said latch member in response to a movement in either direction, a lever to which said cam is secured, springs tending to move said lever in opposite directions about the axis of its fulcrum, a weight tending to move said lever in one of said directions, a pressure-responsive thrust member opposing said weight and adapted to move said lever in the opposite direction, said thrust member having a curved abutment face providing different points of contact for said lever, and means whereby fluid pressure is transmitted from said pump to said thrust member.

11. A pumping apparatus comprising a pump and an automatic stopping device therefor, said automatic stopping device including an operating member movable to stop the pump, a pressure-responsive device acting on said operating member to normally hold the same in an ineffective position, means tending to move said operating member to stop the pump, and a manually operable retaining device adapted to hold said operating member in an ineffective position.

12. A pumping apparatus comprising a pump and an automatic stopping device therefor, said automatic stopping device including an operating member movable to stop the pump, a pressure-responsive device whereby said operating member is normally held in an ineffective position, means tending to move said operating member to stop the pump, and a manually operable retaining device adapted to hold said operating member in an ineffective position, said retaining device comprising a stop for limiting the motion of said operating member, and a spring tending to retain said stop in an inoperative position.

13. A pumping apparatus comprising a pump and an automatic stopping device therefor, said automatic stopping device including a weighted operating lever movable to stop the pump, a pressure-responsive device whereby said operating lever is normally held in an ineffective position, and a manually operable retaining device adapted to hold said operating lever in an ineffective position, said retaining device comprising a stop member pivoted to said lever, an abutment cooperating with said stop member to limit the motion of said lever and a spring tending to displace said stop member from said abutment.

In testimony that I claim the foregoing I hereunto affix my signature.

REINHARD HILDEBRAND.